(12) United States Patent
Hirata et al.

(10) Patent No.: US 9,904,152 B2
(45) Date of Patent: *Feb. 27, 2018

(54) SOLID-STATE LIGHT SOURCE DEVICE

(71) Applicant: Hitachi Consumer Electronics Co., Ltd., Tokyo (JP)

(72) Inventors: Koji Hirata, Yokohama (JP); Hidehiro Ikeda, Yokohama (JP); Nobuyuki Kimura, Yokohama (JP)

(73) Assignee: HITACHI MAXELL, LTD., Osaka (JP)

( * ) Notice: Subject to any disclaimer, the term of this patent is extended or adjusted under 35 U.S.C. 154(b) by 920 days.

This patent is subject to a terminal disclaimer.

(21) Appl. No.: 14/167,707

(22) Filed: Jan. 29, 2014

(65) Prior Publication Data

US 2014/0146293 A1    May 29, 2014

Related U.S. Application Data

(63) Continuation of application No. 12/909,588, filed on Oct. 21, 2010, now Pat. No. 8,662,678.

(30) Foreign Application Priority Data

Feb. 12, 2010  (JP) .................. 2010-028771

(51) Int. Cl.
  *G03B 21/14* (2006.01)
  *F21S 2/00* (2016.01)
  *G03B 21/20* (2006.01)

(52) U.S. Cl.
  CPC ........... *G03B 21/142* (2013.01); *G03B 21/20* (2013.01); *G03B 21/204* (2013.01); *G03B 21/208* (2013.01); *G03B 21/2066* (2013.01)

(58) Field of Classification Search
  CPC ............ G03B 21/14; G04B 21/20; F21S 2/00
  (Continued)

(56) References Cited

U.S. PATENT DOCUMENTS 6,227,682 B1  5/2001  Li
6,452,724 B1  9/2002  Hansen et al.
(Continued)

FOREIGN PATENT DOCUMENTS

JP    10-171045      6/1998
JP    2002-268140 A  9/2002
(Continued)

OTHER PUBLICATIONS

European Search Report issued in European Patent Application No. 10189108.3-1240, dated Apr. 13, 2011.
(Continued)

*Primary Examiner* — Steven H Whitesell Gordon
*Assistant Examiner* — Jerry Brooks
(74) *Attorney, Agent, or Firm* — McDermott Will & Emery LLP

(57) ABSTRACT

A solid-state light source device, enabling to build up with using solid-state elements, and having the structure suitable to be applied as a light source for a projection-type display apparatus, comprises a solid-state light source unit 10 for emitting excitation light therefrom, a reflection mirror (or reflector) 130 made of a parabolic surface, for condensing the excitation light from the solid-state light source to be point-like, and a disc-like (or wheel) member 140, repeating reflection/scattering or transmission/scattering of the excitation light and conversion of the excitation light, alternately, in vicinity of a focus point of the excitation light, which is condensed to be point-like by the reflection mirror (or reflector), wherein the excitation light (B-color) reflected/or scattered by that disc-like (or wheel) member (Continued)

and fluorescence light (Y-color), wavelength of which is converted, is taken on a same optical path, by means of the reflection mirror (or reflector) 130 or a second reflection mirror (or reflector) 130', and thereby outputting a white color light emitting from a point-like light source.

14 Claims, 12 Drawing Sheets

(58) Field of Classification Search
USPC .............................................. 353/31; 362/80
See application file for complete search history.

(56) References Cited

U.S. PATENT DOCUMENTS

| 7,547,114 | B2* | 6/2009 | Li | H04N 9/315 |
| | | | | 353/20 |
| 8,662,678 | B2* | 3/2014 | Hirata | G03B 21/20 |
| | | | | 353/94 |
| 2005/0213058 | A1* | 9/2005 | Inamoto | F21K 9/00 |
| | | | | 353/122 |
| 2005/0270775 | A1* | 12/2005 | Harbers | G02B 27/1046 |
| | | | | 362/231 |
| 2005/0280785 | A1 | 12/2005 | Beeson et al. | |
| 2007/0019408 | A1 | 1/2007 | McGuire et al. | |
| 2007/0188718 | A1 | 8/2007 | Yang | |
| 2009/0034284 | A1 | 2/2009 | Li et al. | |
| 2009/0174632 | A1 | 7/2009 | Najjar et al. | |
| 2009/0187234 | A1 | 7/2009 | Meyer et al. | |
| 2009/0262308 | A1 | 10/2009 | Ogawa | |
| 2009/0284148 | A1 | 11/2009 | Iwanaga | |

FOREIGN PATENT DOCUMENTS

| JP | 2003295319 A | 10/2003 |
| JP | 2004-341105 A | 12/2004 |
| JP | 2007-156270 A | 6/2007 |
| JP | 2007-250498 A | 9/2007 |
| JP | 2009-259583 A | 11/2009 |
| JP | 2009-277516 A | 11/2009 |
| WO | 2009/069010 A1 | 6/2009 |

OTHER PUBLICATIONS

Chinese Office Action, w/ English translation thereof, issued in Chinese Patent Application No. CN 201010525405.9 dated Jan. 30, 2013.

Entire Prosecution History of U.S. Appl. No. 12/909,588, filed Oct. 21, 2010 entitled Solid-State Light Source Device.

* cited by examiner

TO LIGHTING OPTIC SYSTEM

WHEN THERE IS NO RECESS PORTION

WHEN THERE IS RECESS PORTION

SOLID-STATE LIGHT SOURCE DEVICE

This application is a Continuation of U.S. application Ser. No. 12/909,588, filed on Oct. 21, 2010, which relates to and claims priority from Japanese Patent Application No. 2010-028771 filed on Feb. 12, 2010, the entire disclosures of which are incorporated herein by reference.

BACKGROUND OF THE INVENTION

The present invention relates to a solid-state light source device applying a solid-state element, such as, a light emitting diode or a semiconductor laser, etc., as a light source therein, attracting attentions thereon as a light source being superior in energy saving, and in particular, it relates to a solid-state light source device suitable for a projection-type display apparatus, modulating an intensity of the light from a light source depending on a video signal, by means of a light-transmission type or reflection type liquid crystal panel or a digital mirror device (DGD), which is built up with plural numbers of micro mirrors aligned, thereby projecting an optical image formed, enlargedly.

In recent years, as a lightening apparatus is used a light source, widely, applying the solid-state element, such as, the light emitting diode and/or the semiconductor laser, etc. therein, being superior in the energy saving, in the place of a conventional lamp and/or a fluorescent lamp. On the other hand, a profection-type display apparatus is already known in the following Patent Document, for example, which stores within a housing thereof, an optical unit, for modulating an intensity of the light from a light source depending on a video signal by means of light valves and thereby projecting an optical image formed, enlargedly, together with a driver circuit, power source circuits and/or a cooling fan, etc.

However, within such conventional projection-type display apparatus, for the purpose of maintaining a sufficient brightness on a projection surface, in particular, a super or ultra high-pressure mercury lamp having high efficiency per an electric power inputted (for example, 70 lm/W) is mainly applied as the light source thereof, normally, in a lighting optic system.

However, when applying a discharge lamp, generating a white light therefrom, it is necessary to provide a high-voltage power source, causing a difficulty in handling thereof, and also since it is short in the lifetime thereof and low in the shock-resistance thereof, therefore, in the place thereof, ideas or proposals are made, variously, of applying the solid-stake light source, such as, the light emitting diode and/or the laser diode, etc., as the light source of the projection-type display apparatus.

For example, in Japanese Patent Laying-Open No. 2002-268140 (2002) is proposed a projection-type display apparatus, disposing sheet-like light sources, each aligning light emitting diodes emitting a light, one of three (3) primary colors; i.e., red (R), green (G) and blue (B), in an array-like manner, behind a light modulator (i.e., the light valve) corresponding to R, G or B.

Also, in Japanese Patent Laying-Open No. 2004-341105 (2004) is already known a projection-type display apparatus, applying a light emitting diode for generating ultraviolet (UV) rays therefrom, being a solid-state light source, as the light source of the projection-type display apparatus, wherein those UV rays are irradiated on a color wheel, which is made from fluorescent substance layers of R, G and B, successively, thereby to converted them into R-light, G-light and B-light, and each of those color lights is projected, successively, through a space modulator, enlargedly by means of a projection lens, thereby displaying an optical image.

And, in Japanese Patent Laying-Open No. 2009-277516 (2009) is already proposed that applying a light emitting diode or a laser light emitting device for generating a light of blue (B) color, in the place of the light emitting diode for generating a light with using the UV rays mentioned above as excitation lights thereof, for the purpose of avoiding injury or damage due to the UV rays, and thereby maintaining a long life-time of optical parts. Further, in Japanese Patent Laying-Open No. 2009-259583 (2009) is disclosed the structure for dissolving shortage of an amount of lights from the light emitting diodes of green (G) color, in particular, in case where plural numbers of light emitting diodes are applied and the light rays emitted therefrom are condensed to be used. Thus, there is proposed a light source device having a third light source for composing a light (i.e., an excitation light) from the light emitting diode of B-color for the light from the light emitting diode of G-color, by means of a dichroic mirror, and for passing the G-light therethrough, and being excited by absorbing the B-light, thereby generating the G-light.

SUMMARY OF THE INVENTION

As was mentioned in the above, since the super high-pressure mercury lamp, which is used as the light source in the projection-type display apparatus, generates a large amount of the UV rays, therefore it gives a large stress upon the parts which are made up with organic materials, such as, a liquid crystal valve and a polarizing plate, etc., building up the lighting optic system, in particular. For that reason, the lifetimes of those parts are detracted from. Also, the lamp itself brings about lowering of brightness due to abrasion of electrodes and/or cloudiness of a light emitting tube, in a relatively short time period. Further, it has a problem of difficulty in disposal of waste matter thereof, etc., because it contains mercury therein. And, as was mentioned above, though various kinds of the light sources are proposed for the projection-type display apparatus, applying the light emitting diodes and/or the laser diodes therein, in the place of such super high-pressure mercury lamp, in the Patent Document(s) mentioned above; however, in particular, the light source for the projection-type display apparatus has the following problems.

Thus, the projection-type display apparatus enlarges and projects the optical image, which is formed with modification of light intensities of the white color light from a point-like light source having high light emitting efficiency, such as, the super high-pressure mercury lamp, representatively, depending on the video signal, by means of a liquid crystal panel of the transmission-type or the reflection type, or the digital mirror device (DMD) aligning plural numbers of micro mirrors, or the like (in an optical element portion). On the contrary to this, the light source devices (i.e., the solid-state light sources), which are proposed by the conventional arts including the Patent Documents mentioned above, do not necessarily provided a light source being suitable for the projection-type display apparatus. Thus, the light obtainable from the light source devices according to the conventional arts mentioned above are collection or assemblage of lights from a large number of solid-state light sources, which are disposed integrally within a relatively large area, and for that reason, it does not build up a point-like light source of white color light having a necessary amount or intensity of lights, and therefore, in case of applying the solid-state light source mentioned above in the place of the mercury lamp of the conventional art, it is impossible to obtain sufficient powers or performances in a part of an optical system including the light intensity modulator portion, and this may results into a reason of generating deterioration of white-balance and/or color shading on a projection surface.

Then, according to the present invention, it is accomplished by taking the problem(s) of the conventional technologies mentioned above into the consideration thereof, and further in more details thereof, an object thereof is to provide a solid-state light source device, being suitable to be applied as the light source, in particular, within the projection-type display apparatus.

According to the present invention, for accomplishing the object mentioned above, there is provided a solid-state light source device, comprising: a solid-state light emitting means of portion, which is configured to emit excitation light therefrom; a beam condensing means or portion, which is configured to condense the excitation light from said solid-state light emitting means or portion to be point-like; a reflecting/scattering and wavelength converting means or portion, which is configured to repeat reflection/scattering of said excitation light and conversion of said excitation light, alternately, or a transmitting/scattering and wavelength converting means or portion, which is configured to repeat transmitting/scattering of said excitation light and conversion of said excitation light, alternately, in vicinity of a focus point of the excitation light, which is condensed to be point-like by said beam condensing means or portion; and a means or portion, which is configured to take out the excitation light reflected/scattered or transmitted/scattered by said reflecting/scattering and wavelength converting portion or said transmitting/scattering and wavelength converting portion, and the excitation lights converted in wavelength thereof by said reflecting/scattering and wavelength converting portion or said transmitting/scattering and wavelength converting portion, on a same optical path, thereby outputting a white color light emitting, approximately, from a point light source. Also, as the fluorescent substance excited by the excitation light from the solid-state light emitting elements, such as, light emitting diodes and lasers, if selecting a substance emitting a light flux of a region of wavelength, having a relation of being a complementary color to the excitation light for a white color, it is possible to achieve a light source being simple in the structure and having a high efficiency.

Also, according to the present invention, in the solid-state light source device described in the above, it is preferable that said solid-state light emitting portion is constructed with plural numbers of light emitting diodes or semiconductor laser elements, which are disposed on a plane, that said light emitting diodes or said semiconductor laser elements emit a blue color light, and further that the excitation light from said solid-state light emitting portion is a blue color light, being aligned a plane of polarization thereof into one direction. As the fluorescent substance excited by the excitation light of a blue color band, it is common to apply $Y_3Al_5O_{12}$:Ce (yttrium-aluminum-garnet=YAG), emitting the yellow color light at high efficiency, which is in the relation of a complementary color to the blue color light, but should not be limited only to this. Further, for the YAG fluorescent substance, a light emission spectrum and a wavelength of optimal excitation light thereof are also different from depending on the components thereof, therefore it is preferable to select $Y_3Al_5O_{12}$:Ce having high intensity of relative energy in a green color band, or $(Y,Gd)_3Al_5O_{12}$:Ce having high intensity of relative energy in a red color band, etc., appropriately, fitting to necessary characteristics thereof. Other than this, as a yellow color fluorescent substance, emitting lights upon the excitation light of the blue color band, is already known $(Si,Ba)_2SiO_2$ of a silicate group. Also, though it is preferable that a peak wavelength of the blue color light mentioned above is about 460 nm, but it is also possible to adopt the structure having a region for emitting a light of blue-green color band having the peak wavelength of about 510 nm, by scattering/transmitting apart of the excitation light and exciting a part of a blue-green fluorescent substance, with using the blue color light having the peak wavelength of about 430 nm as the excitation light, and a region for emitting the light of yellow color irrespective of the relation of the complementary color to the blue color light. As the blue-green fluorescent substances are already known: $Ca_9MgSi_4O_{16}Cl_2$:Eu or $Sr_4Al_{14}O_{25}$:Eu and $BaSi_2O_2N_2$:Eu, etc.

In particular, when applying the reflecting/scattering and wavelength conversion means or portion mentioned above therein, within the solid-state light source device mentioned above, it is preferable that said beam condensing means or portion and said means or portion for outputting the white color light comprise a mirror surface made of a parabolic surface or an oval surface, a separation mirror, being disposed to face said mirror surface inclining to a direction of rotation axis thereof, and thereby reflecting the excitation light aligned a plane of polarization thereof into one direction towards said mirror surface, while transmitting the excitation light of other directions therethrough, in common with. Also, it is preferable that said reflecting/scattering and wavelength converting portion has a reflecting/scattering surface and a fluorescence surface made of a fluorescent substance, formed on a base member, and repeats the reflection/scattering of said excitation light and the conversion of said excitation light, alternately, through shifting of said base member, and further that said reflecting/scattering and wavelength converting portion has the reflecting/scattering surface and the fluorescence surface made of the fluorescent substance, formed on the disc-like base member, and repeats the reflection/scattering of said excitation light and the conversion of said excitation light, alternately, through rotating movement of said disc-like base member.

And also, in the solid-state light source device mentioned above, it is preferable that said base member is made of a material having thermal conductivity, being equal to or higher than $5/W \cdot m^{-1} \cdot K^{-1}$, that on said reflecting/scattering surface formed on said base member is further formed a penetrating film, which is configured to change a polarization direction of the excitation light reflecting/scattering on said reflecting/scattering surface, or that in a portion where said reflecting/scattering surface and said fluorescent substance are formed, on the surface of said base member, and also in vicinity of the focus point of said excitation light condensed to be point-like are formed a large number of miniature pits for giving a direction to the scattering light from said reflecting/scattering surface or said fluorescent substance in vicinity of said focus point.

On the other hand, when applying the transmitting/scattering and wavelength conversion means or portion mentioned above therein, within the solid-state light source device mentioned above, it is preferable that said beam condensing portion and said portion for outputting the while color light comprise a mirror surface made of a parabolic surface or an oval surface, respectively, and between the mirror surface of said beam condensing portion and said portion for outputting the white color light is disposed said transmitting/scattering and wavelength converting portion, that said transmitting/scattering and wavelength converting portion has a transmitting/scattering surface and a fluorescence surface made of a fluorescent substance, formed on at least one of surfaces of a transparent base member, and repeats the transmitting/scattering of said excitation light and the conversion of said excitation light, alternately, through shifting of said base member, and further that said transmitting/scattering and wavelength converting portion has the transmitting/scattering surface and the fluorescence surface made of the fluorescent substance, formed on at least one of the disc-like transparent base member, and repeats the transmitting/scattering of said excitation light and the conversion of said excitation light, alternately, through rotating movement of said disc-like base member.

Further, within the solid-state light source device mentioned above, it is preferable that on other surface of said transparent base member is formed an anti-reflection film. Also, it is preferable that said transparent base member is made of a material having thermal conductivity, being equal to or higher than $5/W \cdot m^{-1} \cdot K^{-1}$, and that under said transmitting/scattering surface, which is formed on said transparent base member, is further formed a penetration film, which is configured to change a polarization direction of the excitation light transmitting/scattering on said transmitting/scattering surface, and that in a portion where said transmitting/scattering surface and said fluorescent substance are formed, on the surface of said transparent base member, and also in vicinity of the focus point of said excitation light condensed to be point-like are formed a large number of miniature pits for giving a direction to the scattering light from said transmitting/scattering surface or said fluorescent substance in vicinity of said focus point.

And, further thereto, for the solid-state light source device mentioned above, it is preferable to be applied as a solid-state light source device, in a projection-type display apparatus, comprising: that solid-state light source device mentioned above; a light separation optic system, which is configured to separate a white color light from said solid-state light source device into three (3) primary colors, including R (red color), G (green color) and B (blue color); R, G, B light modulating portions, each of which is configured to light-modulate one of polarized lights separated into R, G and B, respectively, thereby forming each optical image of R, G and B, depending on a video signal; a light composing portion, which configured to compose optical images, each being formed by said R, G, B light modulating portions; and a projection portion, which is configured to project said optical image composed, enlargedly.

According to the present invention mentioned above, it is possible to achieve the solid-state light source device for enabling to obtain white color light emitting from an approximately point-like light source, while applying a solid-state light source as the light source. From that, the solid-state light source device can be adopted, in particular, as the light source in the lighting optic system of the projection-type display apparatus, easily, in the place of the conventional super or ultra high-pressure mercury lamp, and thereby obtaining an effect that the optic system portions of the projection-type display apparatus can show the optical performances thereof, fully, comparing to the conventional art; i.e., it is possible to provide a projection-type display apparatus, being improved much more than the conventional art, against generation of deterioration of white-balance and/or color shading on a projection surface, and also reduce the consumption of electric power of the apparatus, greatly, comparing to the conventional one.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein.

DETAILED DESCRIPTION OF THE PREFERRED EMBODIMENTS

Figure 1:
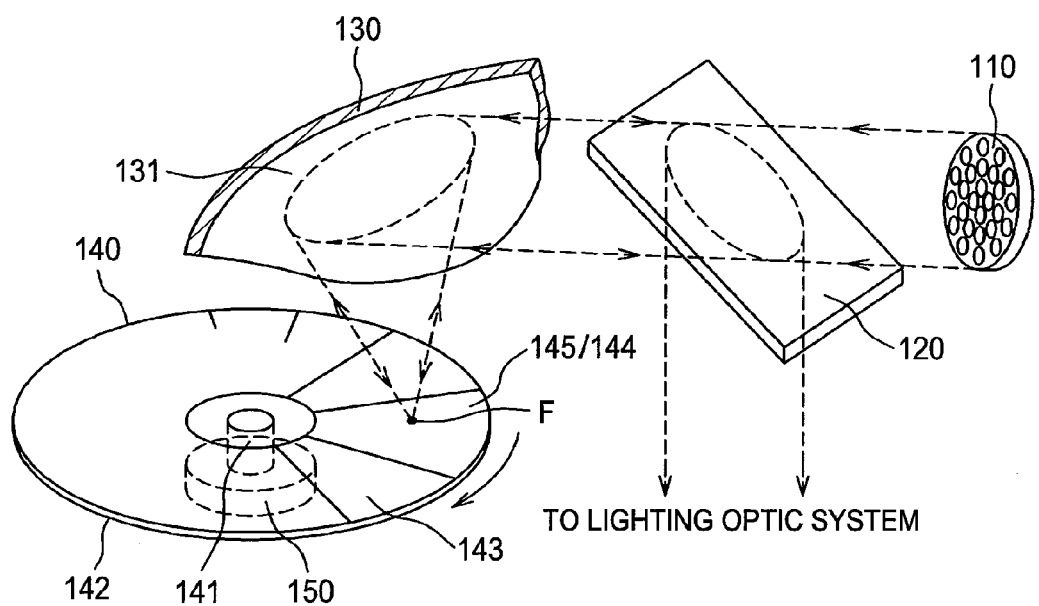
FIG. 1 is a view for explaining about the details of the structures and the principle of a light source unit (i.e., a solid-state light emitting source), being a solid-state light source device according to an embodiment 1.

Hereinafter, embodiments according to the present invention will be fully explained by referring to the attached drawings. However, in each of the drawings, the same reference numerals are given to the constituent elements having the common functions.

Figure 16:
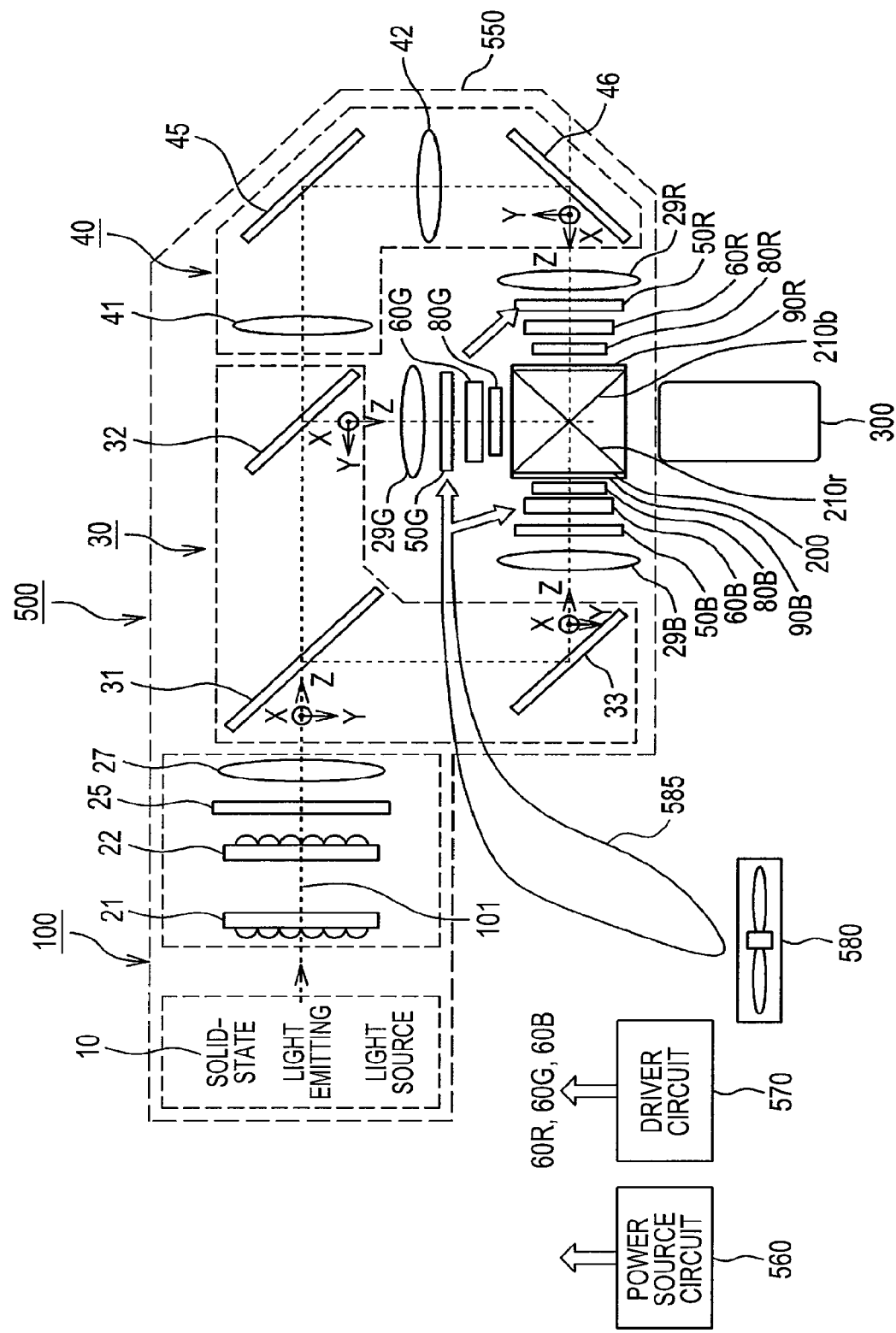
FIG. 16 is a view for showing the entire structures of a projection-type display apparatus applying the light source unit as the light source thereof.

First of all, mentioning will be made on a projection-type display apparatus applying a solid-state light source device according to an embodiment, by referring to FIG. 16 attached herewith. However, this figure shows the entire structures of the projection-type display apparatus, and in particular, the device that executes the modification of light intensity depending on a video signal, by means of, so-called a transmission-type liquid crystal panel. Also, in this figure, when distinguishing an element disposed on an optic path of each color light from others, it will be shown with adding R, G or B presenting a light color after the reference numeral thereof (i.e., an index), and when there is no necessity of making distinction among them, the index will be omitted therefrom. In addition thereto, in this figure will be introduced, so-called local right-hand rectangular coordinates, for the purpose of presenting the polarization direction clearly. Thus, while assuming that an optical axis 101 is a Z-axis, within the surface perpendicular to the Z-axis, an axis parallel with a paper surface of FIG. 16 is defined to be a Y-axis, and an axis directing from a reverse surface of the paper of the figure to a front surface thereof is defined to be an X-axis. The direction parallel with the X-axis is called "X-direction", and the direction parallel with the Y-axis is called "Y-direction", respectively. A polarized light, which is polarized into the X-direction in the polarization direction thereof, is called "X-polarized light", and a polarized light, which is polarized into the Y-direction in the polarization direction thereof, is called "Y-polarized light", respectively.

In FIG. 16, an optic system of the projection-type liquid crystal display apparatus comprises a lighting optic system 100, a light separation optic system 30, a relay optic system 40, three (3) sets of field lenses 29 (29R, 29G and 29B), three (3) sets of transmission-type liquid crystal panels 60 (60R, 60G and 60B), a light composing prism 200 as a light composing means, and a projection lens 300 as a projecting means. The liquid crystal panel has incident side polarizing plates 50 (50R, 50G and 50B) on a side of light incident, and emission side polarizing plates 80 (80R, 80G and 80B) on a side of light emission. Those optical elements are mounted on a base 55, thereby building up the optic unit 500. Also, the optic unit 500 is installed in a housing not shown in the figure, together with a driver circuit 570 for driving the liquid crystal panel 60, a cooling fan 580 for cooling down the liquid crystal panel 60, etc., and a power source circuit 560 for supplying an electric power to each circuit; thereby building up the projection-type display apparatus.

Hereinafter, detailed explanation will be made on each of the portions building up the projection-type display apparatus mentioned above. First, the lighting optic system 100, for irradiating lights upon the liquid crystal panel 60, equally, though the detailed explanation thereof will be given hereinafter, it includes a light source unit 10, being made up with solid-state light emitting elements, each emitting practically or nearly white color lights therefrom, a first array lens 21 and a second array lens 22 building up an optical integrator, a polarized light converter element 25, and a condenser lens (a pileup lens) 27 therein.

The light separation optic system 30, for separating the nearly white color light from the lighting optic system 100 mentioned above into three (3) prime colors, includes two (2) sets of dichroic mirrors 31 and 32, and reflection mirror 33, for changing the direction of an optical path. Also, the relay optic system 40 includes a first relay lens 41, as a field lens, a second relay lens 42, as a relay lens, and two (2) sets of reflection mirrors 45 and 46 for changing the direction of an optical path.

In the structures mentioned above, from the light source unit 10 made up with the solid-state light emitting elements are emitted light rays almost parallel with the X-axis shown by a broken line in the figure. And, the lights emitting from this light source unit 10 are incident upon or enter into the polarized light converting integrator. However, this polarized light converting integrator includes, as is shown in the figure; i.e., the optical integrator made up with the first array lens 21 and the second array lens 22, for obtaining the uniform lighting, and the polarized light converter element 25 made up with the polarized beam splitter array, for converting the lights into a linearly polarized light by aligning the polarization directions thereof into a predetermined polarization direction. Thus, in the polarized light converting integrator mentioned above, the lights from the second array lens 22 are aligned, by the polarized light converter element 25, into a predetermined direction in the polarization direction thereof; for example, X-polarized light of the linearly polarized light (i.e., a light in the X-direction, having polarization direction perpendicular to the paper surface of FIG. 16 within the plane perpendicular to the optical axis 101).

And, a projection image of each of lens cells of the first array lens 21 is piled up on each liquid crystal panel 60, respectively, by means of the condenser lens 27, the field lenses 29G and 29B, the relay optic system 40, the field lens 29R. In this manner, it is possible to light up or illuminate the liquid crystal panel, equally, while aligning the lights from the lamp (i.e., the light source), at random in the polarization directions thereof, into the predetermined direction of polarization (herein, the X-polarized light).

On the other hand, the light separation optic system 30 separates the nearly white light emitted from the lighting optic system 100 into the three (3) primary colors of the lights, i.e., B-light (the light of a blue color band), G-light (the light of a green color band) and R-light (the light of a red color band), and they are guided into optical paths (i.e., B-light path, G-light path and R-light path) directing to the corresponding liquid crystal panels, respectively. Thus, the B-light reflecting on the dichroic mirror 31 is further reflected upon the reflection mirror 33, and after passing through the field lens 29B and the incident side polarizing plate 50B, they are incident upon or enter into the liquid crystal panel 60B for use of the B-light (the B-light path). Also, the G-light and the R-light, after passing through the dichroic mirror 31, are separated into the G-light and the R-light by means of the dichroic mirror 32. The G-light is reflected on the dichroic mirror 32, and after passing through the field lens 29G and the incident side polarizing plate 50G, it is incident upon or enters into the liquid crystal panel 60G for use of G-light (the G-light path). The R-light passes through the dichroic mirror 32, and is incident upon or enters into the relay optic system 40.

The R-light incident upon the relay optic system 40, after passing through the reflection mirror 45 by means of the first relay lens 41 of the field lens, is condensed (or, focused) in the vicinity of the second relay lens 42, and is scattered directing to the field lens 29R. And, it is brought to be almost parallel with the optical path by means of the field lens 29R, and after passing through the incident side polarizing plate 50R, it is incident upon or enters into the liquid crystal panel 60R for use of the R-light (the R-light path).

Following to the above, each liquid crystal panel 60 (60R, 60G or 60R), building up the light intensity modulator portion, is driven by the driver circuit 570, and the degree of polarization thereof is increased by the incident side polarizing plate 50 (50R, 50G or 50R) having a transmission axis in the X-direction, and it modulates the color lights of the X-polarization incident upon or entering from the light separation optic system 30 (i.e., the light intensity modulation) depending on a color video signal shown in the figure; thereby forming an optical image of the Y-polarization of each color light.

The optical image of the Y-polarization of each color light, which is formed in such a manner, as was mentioned above, is incident upon the emission side polarizing plates 80 (80R, 80G and 80R). The above-mentioned emission side polarizing plates 80R, 80G and 80R are those having the transmission axis thereof in the Y-direction. With this, unnecessary components of the polarized lights (herein, the X-polarized light) are removed from, and thereby a contrast thereof is increased.

The optical image of the Y-polarization of each color light, which is formed in such a manner, as was mentioned above, is incident upon the light composing prism 200, as the light composing means. In this moment, the optical image of the G-light is incident upon, remaining as the Y-polarization (i.e., P-polarization with respect to a dichroic film surface of the light composing prism 200). On the other hand, on the B-light path and the R-light path, since ½λ wavelength plates 90B and 90R are provided between the emission side polarizing plates 80B and 80R and the light composing prism 200, the optical images of the B-light and the R-light of the Y-polarization are converted into the optical images of the X-polarization (i.e., S-polarization with respect to the dichroic film surface of the light composing prism 200, for conducting the color composing thereof), and thereafter, they are incident upon the light composing prism 200. This is because of taking the spectral characteristics of the dichroic film 210 into the consideration thereof; i.e., by conducting so-called SPS composition with bringing the G-light into the P-polarized light while the R-light and the B-light into the S-polarized light, for conducting the light composing with high efficiency.

Following to the above, the light composing prism 200 is made up with a dichroic film (dielectric multi palyers) 210b reflecting the B-light thereon and a dichroic film (dielectric multi palyers) 210r reflecting the R-light thereon are formed on the boundary surfaces of four (4) pieces of rectangular prisms, in an X-like (or, a cross-like) manner. Among three incident surfaces of the light composing prism 200, the B-light and the R-light entering into the incident surfaces opposing to each other (i.e., the S-polarized light with respect to the dichroic film surface) are reflected upon the dichroic film 210b for use of the B-light and the dichroic film 210r for use of the R-light, respectively, which are crossing with each other. Also, the G-light entering into a central incident surface (i.e., the P-polarized light with respect to the dichroic film surface) propagates straight ahead. Those optical images of the color lights are optically composed with, and a color image light (composed light) is emitted from the emission surface.

And, the composed light emitting from the light composing prism 200 mentioned above is projected on a screen (not shown in the figure) of the transmission type or the projection type, through a projection lens 300, like a zoom lens, for example, and thereby a picture enlargedly projected is displayed thereon. However, the cooling fan 580 mentioned above makes ventilation, in particular, for the parts, which are heated by the light of high intensity from the light source unit 10, or need cooling thereof, for example, the incident side polarizing plate 50, the liquid crystal panel 60, the emission side polarizing plate 80, etc., among various kinds of parts building up the projection-type display apparatus mentioned above, through a flow passage 585, which is formed directing to those parts. Thus, apart of the irradiation lights from the light source unit 10 is absorbed therein, and thereby cooling down the heat generated due to that.

However, in the embodiment mentioned above, thought there is shown the example of building up the light intensity modulator portion with three (3) transmission-type liquid crystal panels 60 (60R, 60G and 60B); however, the present invention should not be limited to this, and that light intensity modulator portion may be constructed with the reflection-type liquid crystal panels, or the digital mirror device (DMD) aligning plural numbers of micro mirrors, etc.

Following to the above, explanation will be given hereinafter, on the details of the light source unit (the solid-state light source device) 10 made up with the solid-state light emitting elements, for emitting light rays of the white color light almost parallel with the optical axis 101, in the projection-type display apparatus, the structures thereof being explained in the above, in particular, in the lighting optic system 100 thereof.

Embodiment 1

Figure 2:
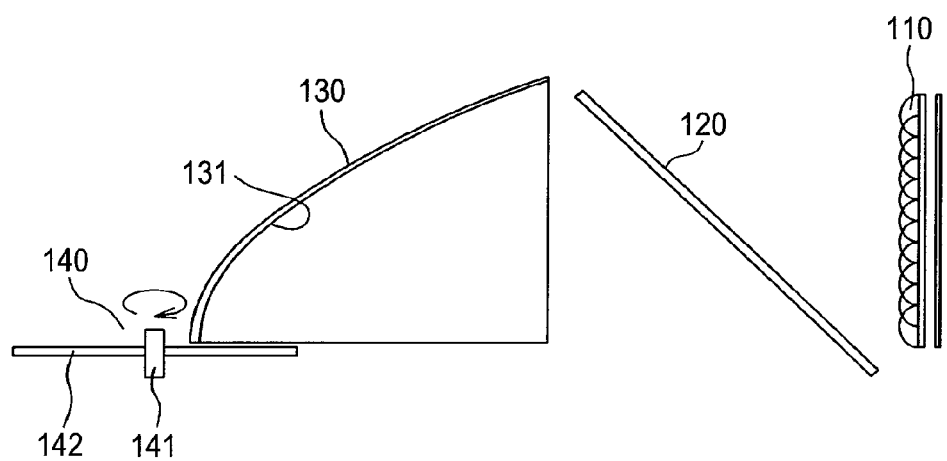
FIG. 2 is a vertical cross-section view of the light source unit.

FIG. 1 attached herewith is a view for explaining the principle of the light source unit 10, according to an embodiment 1. As is apparent from the figure, that unit 10 comprises a semiconductor laser element group 110, aligning plural numbers of semiconductor laser elements or light emitting diodes, each emitting a light of blue color band (B-color), on an almost disc-like substrate, as a light emitting source of the solid-state elements, a separation mirror 120 disposed inclining at an angle of about degree, facing to a laser beam emitting surface of the semiconductor laser element group 110 mentioned above, a reflection mirror (a reflector) 130 having a parabolic surface, for example, which is disposed at a position facing to that laser beam emitting surface of the semiconductor laser element group 110 mentioned above, a disc (or wheel) member 140 rotating round in the vicinity of a focus point (F) of that reflection mirror, and a driving means for rotationally drive that disc (or wheel) member 140 at a rotation speed desired, for example, an electromotive motor 150. However, the vertical cross-section of this light source unit 10 (but, excepting the electromotive motor 150) is shown in FIG. 2 attached herewith.

In the structures of the light source unit 10 mentioned above, firstly will be given an explanation on the semiconductor laser element group 110, for generating excitation lights. As will be apparent from the explanation given hereinafter, as a light source for generating the excitation lights, although the solid-state light emitting element, such as, the light emitting diode or the laser light source is superior, for example, however, in general, since the laser having a high output is expensive, then it is preferable to use plural numbers of semiconductor laser elements of the blue color laser in combination, as was mentioned above, as an excitation light source. In particular, because of that it belongs to the blue color band in the visible ray region, that it has a high-energy efficiency, that it has a narrow band, and further that it has a single polarization, it is preferable to use a blue color laser beam, and in the present embodiment, a large number of the semiconductor laser elements, each emitting the light of the blue color band (B-color) are aligned on the substrate having the disc-like shape, as was mentioned above, a rectangular shape, or a polygonal shape, for example; thereby building up the semiconductor laser element group 110. Also, those semiconductor elements of large number thereof are so disposed that the beams emitting from the light emitting surfaces of those are aligned into a predetermined direction in a plane of polarization thereof.

Figure 3:
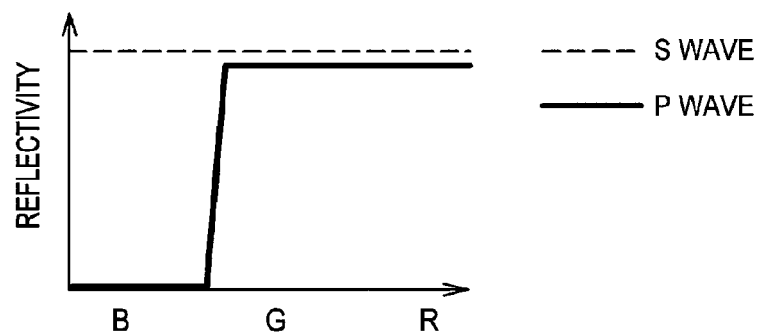
FIG. 3 is a view for showing an example of characteristics of a separation mirror, which builds up the light source unit.

Next, the separation mirror 120, which is obliquely disposed facing to the laser light emitting surface of the semiconductor laser element group mentioned above, as will be apparent from the explanation that will be given hereinafter, passes the blue color laser beams emitting from the semiconductor laser element group and aligned the plane of polarization thereof into the predetermined direction therethrough, directing to the reflection mirror (the reflector) 130, and it also receives them from the reflection mirror (the reflector). With the lights having the plane of polarization in the direction perpendicular to that plane of polarization, this mirror has a function of reflecting them thereupon. Further, an example of the characteristics of this separation mirror 120 will be shown in FIG. 3 attached herewith.

Further, the reflection mirror (the reflector) 130 defines a reflection mirror (surface) 131 having a parabolic surface, which can be obtained by rotating a parabola, or a curved surface based on that parabolic surface or an oval surface, which can be obtained by rotating an oval, on an inner surface side thereof, and has a shape being cut to half (½) approximately, along the rotation axis thereof. Further, through will be mentioned later, the blue color laser beams emitting from the semiconductor laser element group 110 and passing through the separation mirror 120, as was mentioned above, are reflected upon the reflection surface on the inner surface side of this reflection mirror (the reflector) 130, and are condensed to the vicinity of the focus point thereof (shown by "F" in FIG. 1 mentioned above). Also, the mirror reflects the lights emitting from the vicinity of that focus point to be parallel lights, directing to the separation mirror 120 mentioned above.

Figure 4A:
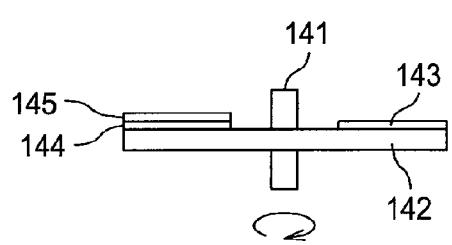
FIGS. 4A and 4B are views for showing the detailed structures of a disc (or wheel) member, which builds up the light source unit.
Figure 4B:
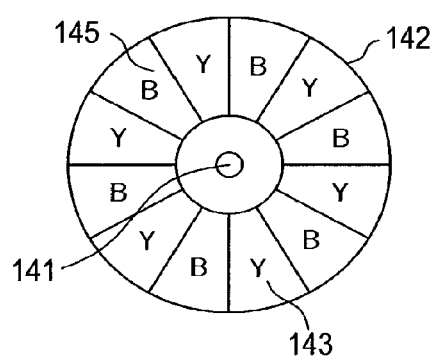

And, in FIGS. 4A and 4B attached herewith are shown the details of the disc (or wheel) member 140 mentioned above. However, FIG. 4A shows a side-surface cross-section view of the disc (or wheel) member 140, and FIG. 4B shows an upper view thereof.

As is apparent from those figures, this disc (or wheel) member 140 has a rotation shaft 141 at a central portion thereof, for a rotational driving, and a disc-like shaped base member 142, as well. And, on the surface of the disc-like base member 142, rotation of which is controllable, there are provided (or divided) plural numbers (12 pieces in the present example) of segment regions. Those plural numbers of segment regions can be divided into two (2) regions. On one segment region (shown by "Y" in FIG. 4B) is provided a fluorescence surface 143 made from a fluorescence layer, receiving an excitation light (blue color (B) laser beam) of the visible ray region and emitting a light of a predetermined region of wavelength band therefrom, while on other segment region is provided a reflection surface 144 for reflecting/scattering the excitation light, and further thereon is provided a penetration film 145, as a phase conversion means for shifting the phase of the excitation light by only ¼ wavelength (¼λ) (shown by "B" in FIG. 4B), covering on that surface thereof. And, with rotation of this base element 142 at a predetermined speed, the excitation light reflected upon the reflection mirror (the reflector) 130 and condensed at the vicinity of the focus point "F" results to be incident or enter onto the fluorescence surface 143 (Y) and the reflection surface 144 covered with the penetration film 145 on the surface thereof, alternately, as is shown by a circle of thick line in FIG. 4B. As a result thereof, from the disc (or wheel) member 140 mentioned above can be taken out a ray of light emitting from the fluorescent substance and the excitation light scattering/reflecting upon the reflection surface 144 of the base member 142, in a time-sharing manner.

Figure 5:
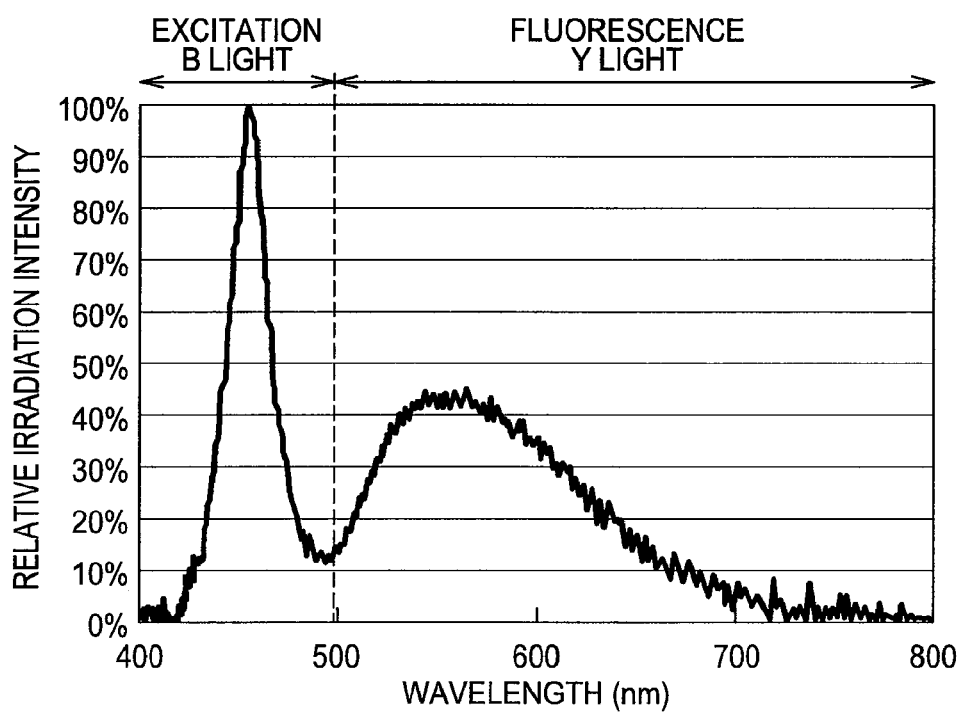
FIG. 5 is a view for showing an example of relationship between an excitation light, which is reflected upon the disc (or the wheel) member, and a fluorescence light generating due to that excitation.

However, as the fluorescent substance to be applied to form the one segment region "Y" on the base member 142 mentioned above, i.e., the fluorescent substance, being excited by the excitation light of the blue region and emitting the light therefrom, it is common to use YAG fluorescent substance $((Y,Gd)_3(Al,Ga)O_{32}:Ce_{3+})$, emitting a yellow light at high efficiency having a complementary color relationship for the blue light. However, according to the present invention, it should not be limited to this, but may be other than that, as far as it is excited and by the excitation light of the blue region and thereby emitting the yellow light therefrom. Further, as to the excitation light of this blue color region and the fluorescent substance of Y-color, being excited by that excitation light and emitted therefrom, an example of the relationship between the wavelength and the intensity of those will be shown in FIG. 5 attached herewith.

Also, since the fluorescent substance is excited by the excitation light and generates heats therefrom, then as the disc-like base member 142 forming that fluorescent substance on the surface thereof, it is preferable to use a material having high thermal conductivity. For example, with using crystal or sapphire, or metal, having the thermal conductivity equal to or higher than $5/W \cdot m^{-1} \cdot K^{-1}$, it is possible to make cooling with preferable efficiency, and as a result thereof, it is effective to increase an efficiency of light emitting of the fluorescent substance and also for a long lifetime thereof.

Following to the above, explanation will be made hereinafter, on operations of the light source unit 10, the detailed structures of which were explained in the above, i.e., the operation of emitting a light beam or flux of the white color light therefrom, nearly in parallel with the optical axis 101, within the lighting optic system 100 of the projection-type display apparatus.

Again, explaining by referring to FIG. 16 mentioned above, the light of the blue color band (B-color) from the semiconductor laser element group 110, aligning the plane of polarization thereof into the predetermined direction, passes through the separation mirror 120, directing to the reflection mirror (the reflector) 130, and is reflected upon the reflection mirror (surface) 131 on the inner surface side thereof; thereby being focused in the vicinity of the focus point "F" thereof. The light of the blue color band (B-color) focused in the vicinity of the focus point "F", accompanying rotation of the disc (or wheel) member 140, is incident upon or enters onto the fluorescence surface 143 (Y) and the reflection surface 144 (B), which are formed on the surface of the disc-like base member 142 building up that member, sequentially. As a result of that, the light of the blue color band (B-color) is received on the layer of the fluorescent substance as the excitation light, on the fluorescence surface 143 mentioned above, and is converted to the fluorescent light, i.e., the yellow color light; thereby emitting the light. On the other hand, it is reflected/scattered on the surface thereof, on the reflection surface 144 (B) mentioned above, and this is repeated, continuously. However, in this instance, since the light, being incident upon the reflection surface 144 (B) and thereby being reflected/scattered on the reflection surface thereof, passes through the penetration film 145 covering on the surface thereof, as the phase converting means for shifting the phase by ¼ wavelength (¼λ), two (2)

times, therefore the plane of polarization thereof is changed by 90 degree only (i.e., the phase is shifted only by ½ wavelength (½λ)).

And, as was mentioned above, the light (i.e., the yellow color light), emitting from the fluorescence surface 143 of the disc (or wheel) member 140, and the B-color light, e.g., the reflection light from the reflection surface 144 (B) thereof are directed to the reflection mirror (the reflector) 130 mentioned above, again, and they are reflected upon the reflection mirror (surface) 131 on the inner surface side thereof, to be directed to the separation mirror 120, again, in the form of a parallel light beam or flux. Further, this separation mirror 120, as was mentioned above, reflects the B-color light, the polarization of which is changed by means of the penetration film 145 only by 90 degree. Also, the light (i.e., the yellow color light) emitting from the fluorescence surface 143 is reflected upon the separation mirror 120, in the similar manner. As a result of that, the B-color light as the excitation light and the yellow color light from the fluorescence surface are mixed accompanying with the rotation of the disc (or wheel) member 140 mentioned above, and come to a light having almost while color. Thus, by means of the light source unit 10 mentioned above, an illuminating light of the white color can be obtained, being incident upon the lighting optic system 100 of the projection-type display apparatus, emitting from the reverse surface of the separation mirror 120 (i.e., the surface opposite to the surface, on which the polarized light from the semiconductor laser element group 110 is incident upon or enters) towards a down direction in FIG. 1.

As was mentioned above, with the light source unit 10, according to one embodiment of the present invention, it is possible to obtain a white color light source, through color mixing due to afterglow or persistence by emitting the light beam or flux of the predetermined wavelength band emitting from the fluorescent substance (i.e., the yellow color light) and the excitation (blue color) light beam or flux reflected/ scattered on the reflection surface, sequentially, exchanging between them. In more details, a member, which builds up the light source unit 10, in particular, the disc (or wheel) member 140 having the reflection surface for reflecting the excitation light thereupon, is rotated at high speed, together with the fluorescence surface for converting the yellow color light into the yellow color light; i.e., exchanging the segment, upon which the excitation light is incident, sequentially, thereby obtaining the white color light. With this, that unit 10 can be applied as the lighting optic system. Further, as to the speed for exchanging between the yellow color light and the blue color light mentioned above, in particular, when applying this into the projection-type display apparatus, it is preferable to be equal to or higher than approximately quad-speed (240 Hz) of a color wheel speed, which is used in a projector of DLP method applying a mercury lamp therein, for example.

And, in particular, for the white color light source to be applied in the lighting optic system 100 of the projection-type display apparatus, it is important to emit the light beam or flux, which is obtained from a point-like light source. Thus, in a general projection-type display apparatus of the conventional art mentioned above, as the light source thereof is mainly adopted the super or ultra high-pressure mercury lamp having high efficiency per an electric power inputted, and in that case, a filament of that lamp built up a point-like light emitting source, and the white color light as the light source is obtained, by brining the lights from such point-like light emitting source into the parallel lights. For that reason, within the projection-type display apparatus, as was mentioned in the conventional technology of the present specification, the optic system for producing a desired image or picture upon the white color light from the lighting optic system 100, including the light intensity modulating portion, and also including the light separation optic system 30 and the relay optic system 40, etc., for example, it is designed upon basis of the parallel lights obtainable from such point-like light emitting source. For that reason, in case of adopting the light source of disposing the large numbers of light emitting diodes or the semiconductor laser elements including R, G and B on a plane, then sufficient performances cannot be obtained in the portions of the optic systems, and there is a problem of generating deterioration of white-balance and/or color shading on a projection surface.

For such problem, with the light source unit 10 motioned above, according to the one embodiment of the present invention, as is apparent from the structures thereof, the excitation (blue color) lights from the semiconductor laser element group 110 are focused at the focus point "F" thereof by the reflection mirror (the reflector) 130, and are converted into the yellow light or reflected, as a point-like light, upon the fluorescence surface and the reflection surface of the disc (or wheel) member 140. With this, the white color light obtained from the light source unit 10, according to the embodiment of the present invention, comes to be the light beam or flux obtained from the point-like light source, in the similar manner to that of the mercury lamp as was mentioned above. For that reason, the light source unit 10, according to the embodiment of the present invention, can be adopted as it is, even into the conventional projection-type display apparatus, but excepting only the lighting optic system; i.e., being superior in ability to be a substitute for the conventional light source and advantageous. However, in such case, in addition to a long lifetime and an increase of the shock-resistance thereof, due to adoption of the solid-state light source, such as, the light emitting diodes and the laser diodes or the like, and further since there is no necessity of proving high-voltage power source(s) necessary with applying the discharge lamp therein, therefore it is advantageous from a viewpoint of reducing manufacturing costs of products.

Further, in FIGS. 6A and 6B and FIGS. 7A and 7B attached herewith is shown other example (a variation) of the disc (or wheel) member 140 mentioned above.

Figure 6A:
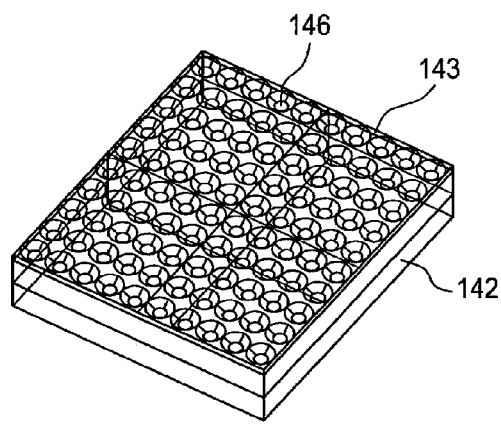
FIGS. 6A and 6B are views for showing other example, forming a recess portion on the surface of the disc (the wheel) member.
Figure 6B:
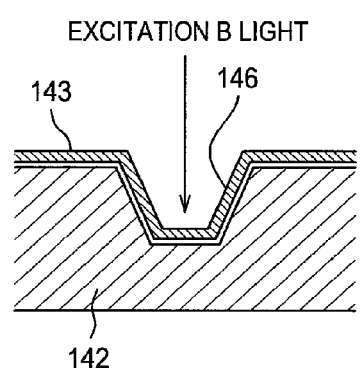

In this other example, a large number of miniature recess portions 146 are formed on the surface of the disc-like base member 142 building up the disc (or wheel) member 140, in particular, on the surface in the vicinity of the focus point "F", upon which the excitation light is incident (a portion of a circle of thick line in FIG. 4B), wherein in FIG. 6A shows an enlarged perspective view of a portion forming the miniature recess portions thereon, being cut out from the disc-like base member, and FIG. 6B shows an enlarged cross-section view of the base member including one (1) of those recess portions therein. And, as is apparent from those figures, on one segment region "Y" is formed the fluorescence surface 143 made of fluorescence layers, covering over the miniature recess portions 146, e.g., the large number of cone-shaped dents or pits formed on the surface, and on the other segment region "B" are formed the reflection surface 144 (B) and the penetration film 145, not shown in the figure herein, covering over the miniature recess portions 146, e.g., the large number of cone-shaped dents or pits formed on the surface.

Figure 7A:
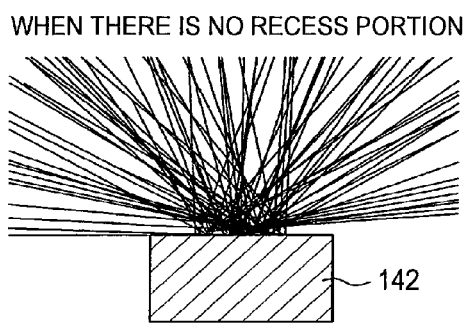
FIGS. 7A and 7B are views for showing scattering condition of the luminescence lights in the other example of the disc (or the wheel) member, in comparison with an example that does not form the recess portion thereon.
Figure 7B:
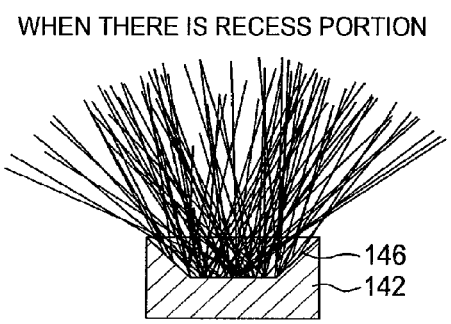

In general, in case where no such recess portion is formed on the incident surface of the excitation light, although the fluorescence light emitting upon the incidence of the excitation light emits into all directions, as is shown in FIG. 7A, but with the disc (or wheel) member 140 according to this other example, in comparison with the above-mentioned, since the fluorescence lights emitting from the surface formed in that recess portion 146 upon the incidence of the excitation light are narrowed in the scattering directions thereof, as is shown in FIG. 7B (i.e., giving a direction), then they can be caught easily by the reflection mirror (the reflector) 130 disposed in an upper portion thereof; for that reason, this may be advantageous from a view point of an efficiency of utilizing the lights. Also, that recess portion may be provided, not only in the segment region "Y", but also in the other segment region "B", and also in such case, similar to the mentioned above, scattering directions of the excitation lights reflected/scattered on that reflection surface are narrowed (i.e., giving a direction), then this is advantageous, also from the viewpoint of the efficiency of utilizing the lights.

Figure 8:
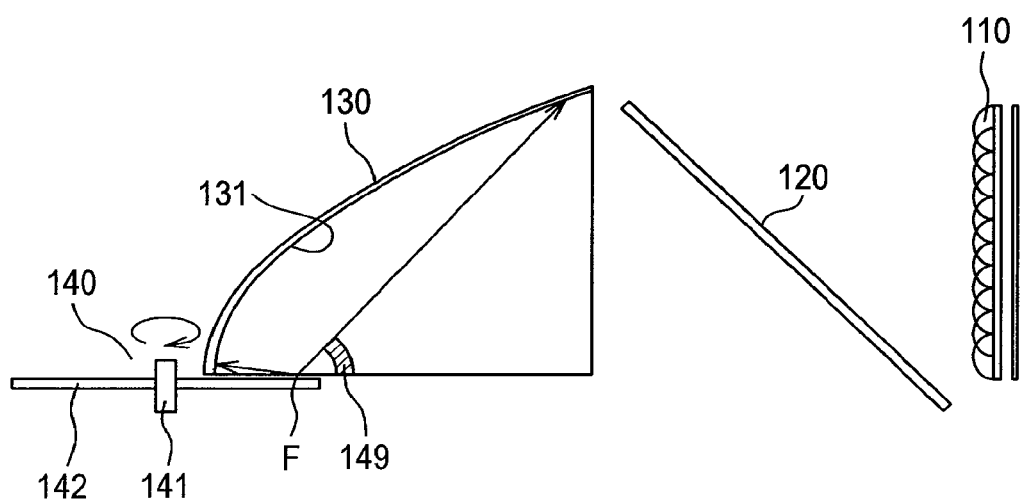
FIG. 8 is a view for showing further other example of the disc (or the wheel) member.

Further, other variation will be shown in FIG. 8. In this variation, as is apparent from the figure, on an outer periphery of the disc (or wheel) member 140 mentioned above is provided a spherical surface reflection mirror (a spherical surface reflector) 149, for reflecting the fluorescence lights thereupon, emitting from the vicinity of the focus point "F", upon which the excitation lights are incident, but not reaching onto the reflection surface 131. With provision of such spherical reflector 149, since it is possible to output almost of all of the fluorescence lights emitting from the vicinity of the focus point "F" through the reflection mirror (the reflector) 130, it would be advantageous from a viewpoint of the efficiency of utilizing the lights.

However, in the example shown in the above, although the mentioning was made on that obtained by cutting the parabolic surface or the oval surface or the like, into half (½) approximately, along the rotation axis thereof, as the reflection mirror (or reflector); however, the present invention should not be restricted only to this, as will be shown hereinafter, it is also possible to apply the parabolic surface or the oval surface obtained as a whole thereof as the reflection mirror, as well as, the structure of combining a condenser lens therewith (see FIG. 9 attached herewith), and further the structure of applying a total reflection lens 135 therein (see FIG. 10 attached herewith).

Figure 9:
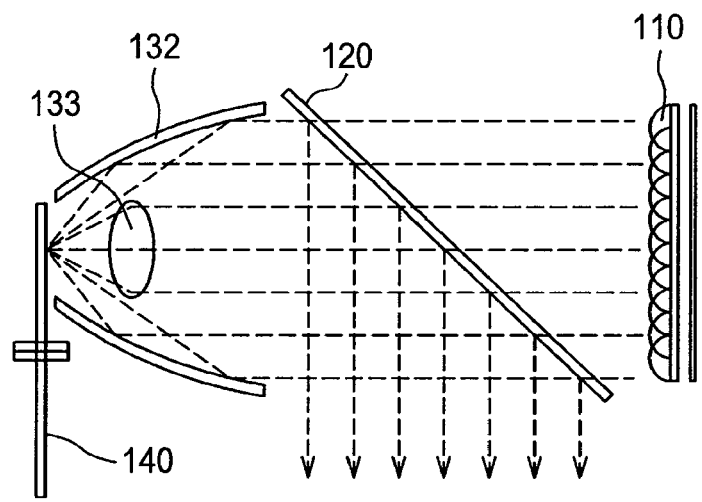
FIG. 9 is a view for showing a variation of utilizing a reflection mirror (i.e., a reflector) of other shape, within the light source unit according to the embodiment 1.

First of all, in an example shown in FIG. 9, as the reflection mirror (or reflector) is disposed a reflection mirror (or reflector) 132 not cut off together with a condenser lens 133, separating from the reflection mirror, in the vicinity of a center of that reflection mirror. With the reflection mirror (or reflector) of such structure, among the blue color laser beams emitting from the semiconductor laser element group mentioned above and passing through the separation mirror 120, the light beam in the vicinity of the optical axis transmits the condenser lens 133, while the light beam separating from the optical axis is reflected upon the reflection mirror 132, and thereby any one the light beams is condensed or focused at a point on the disc (or wheel) member 140. With this, the blue color laser beam is reflected and scattered by the function of the disc (or wheel) member 140 mentioned above, or is converted into the yellow color and scattered. Thereafter, among the blue color lights and the yellow color lights, those being scattered by the disc (or wheel) member 140, the light beam in the vicinity of the optical axis passes through the condenser lens 133 mentioned above, again, on the other hand, the light beam separating from the optical axis is reflected upon the reflection mirror 132; i.e., any one of the light beams comes to be in parallel with the optical axis and reflected on the separation mirror 120; thereby obtaining the white color illumination light to be incident upon the lighting optic system 100 of the projection-type display apparatus. And, it is also possible to suppress an influence of color aberration, differing the focus position depending on the color, down to a level having no problem, practically.

Figure 10:
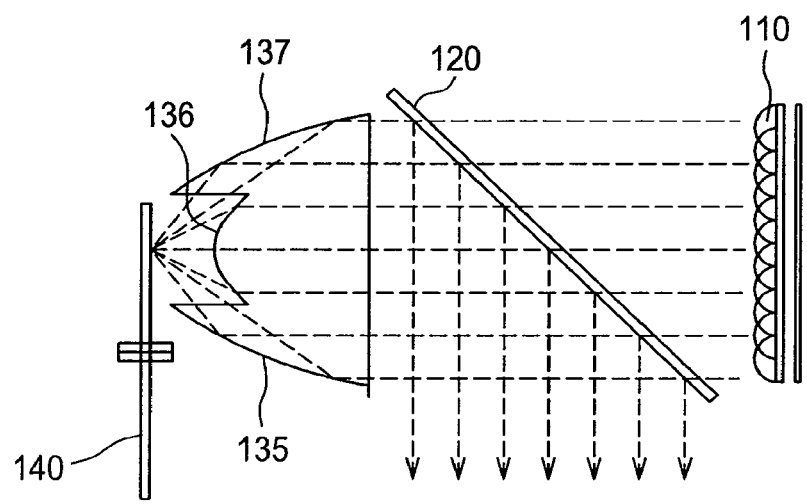
FIG. 10 is a view for showing a variation of utilizing a total reflection lens as the reflector, in the light source unit of the embodiment 1.

In FIG. 10 is shown the structure of applying the so-called total reflection lens 135, being built up with the total reflection surface and the condenser lens in one (1) member from one (1) piece of member. With such structure, the blue color laser beam in the vicinity of the optical axis passes through portion of the condenser lens 136, on the other hand, the blue color laser beam at a position separating from the optical axis is reflected totally on the total reflection portion 137; i.e., any one of the light beams is condensed or focused at one point on the disc (or wheel) member 140, and thereafter are reflected/scattered remaining as the blue color light, or are converted into the yellow light and also scattered. Then, among the blue color lights and the yellow color lights scattering from the one (1) point of the disc (or wheel) member 140, the light beam in the vicinity of the optical axis passes through the condenser lens portion 136, on the other hand, the light beam separating from the optical axis is reflected, totally, on the total reflection portion 137; i.e., any one of the light beams comes to a light beam in parallel with the optical axis, and further is reflected on the separation mirror 120, to be incident upon the lighting optic system 100 of the projection-type display apparatus. Further, on the total reflection portion 137, it is also possible to form a reflection film on the surface thereof, and also, for the surface configuration thereof, it is preferable to have a reflection mirror (surface) having a curved surface, such as, the parabolic surface or the oval surface mentioned above, similar to the reflection mirror (or reflector) mentioned above. Thus, even with such structure, it is possible to obtain the white color illumination lights, in the similar manner to that mentioned above, and also to suppress the influence of color aberration, differing the focus position depending on the color, down to a level having no problem, practically.

Embodiment 2

In the embodiment 1 mentioned above, although description was made on the case where the base member 142 building up the disc (or wheel) member 140 mentioned above is basically the reflection surface, however next thereto, as an embodiment 2, detailed description will be made on the case where a permeable material is used for that base member 142', hereinafter. But, in the explanation given below, the reference numerals, which are same to those in the embodiment 1 mentioned above, indicate the constituent elements same to the above.

Figure 11:
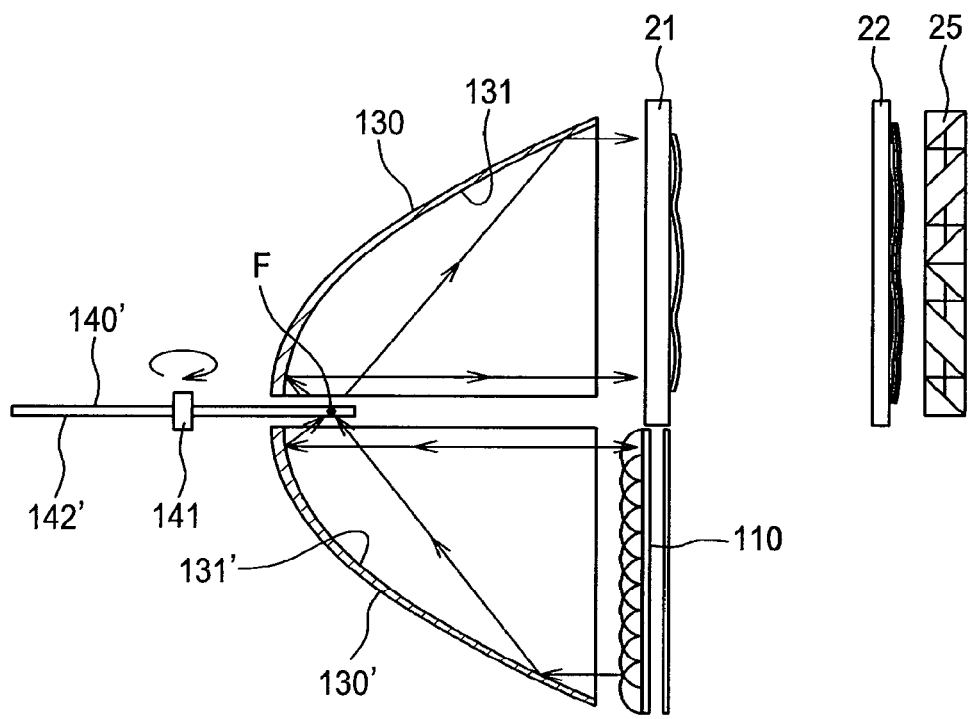
FIG. 11 is a view for explaining the detailed structures of the disc (or the wheel) member, which builds up the light source unit in an embodiment 2.
Figure 14:
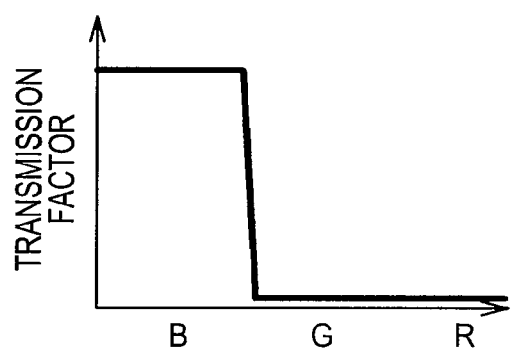
FIG. 14 is a view for showing an example of optical characteristics (a transmission factor), which is provided with a reflection coat, which builds up the light source unit in an embodiment 2.

As is shown in FIG. 11 attached, in the light source unit (i.e., the solid-state light source device) according to the embodiment 2, without applying the separation mirror 120 mentioned above, but in the place thereof is provided a similar reflection mirror (or reflector) (hereinafter, being called a "second reflection mirror 130'"), below the reflection mirror (or reflector) 130 (hereinafter, being called the "first reflection mirror (or reflector) 130, in such a manner that the reflection surfaces 131 and 131' thereof face to each other. And, in a direction of an opening of that second reflection mirror (or reflector) 130' (on the right-hand side in the figure) is disposed the semiconductor laser element group 110 mentioned above, so as to cover the opening surface thereof, in other words, insersecting the parabolic surface mirror at a right angle with respect to a rotation axis thereof. Also, a disc (or wheel) member 140', the details of which will be explained below, is disposed in such a manner that a portion thereof is inserted into a gap defined between the first and second reflection mirrors (or reflectors) 130 and 130', and it is also rotationally driven by a driving means not shown in the figure at a desired rotation speed. Also, in this figure, reference numerals 21 and 22 depict the first and second array lenses (see FIG. 16), and a reference numeral 25 depicts the polarized light converter element 25 for converting lights into linearly polarized lights (see FIG. 14).

Figure 12:
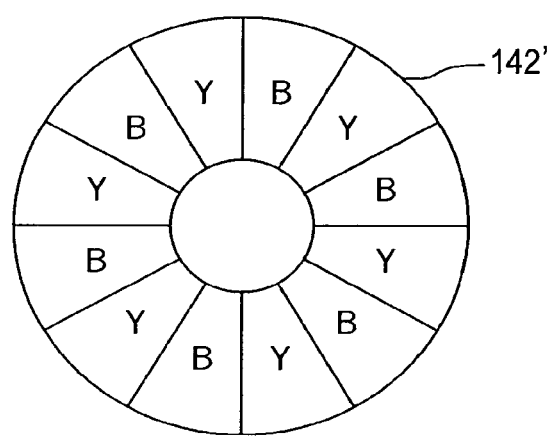
FIG. 12 is an upper view for showing the detailed structures of the disc (or the wheel) member, which builds up the light source unit in an embodiment 2.

In this embodiment 2, the disc-like base member 142' building up the disc (or wheel) member 140' is made of a permeable material, for example, glass, crystal, sapphire, etc. And, as is shown in FIG. 12 attached herewith, a surface of that permeable base member 140' is divided into plural numbers (12 pieces in the present example) of segment regions (e.g., "Y" and "B" in the figure).

Figure 13A:
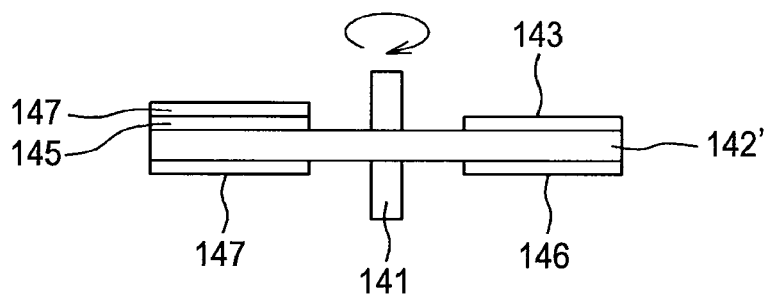
FIGS. 13A and 13B are side views for showing the detailed structures of the disc (or the wheel) member, which builds up the light source unit in an embodiment 2.

And, as is apparent from FIG. 13A attached herewith, within one segment region "Y", on the surface for emitting the excitation light therefrom (i.e., an upper surface) is provided a fluorescence surface 143 made of the layer of fluorescent substance, which receives the excitation light (e.g., the blue color (B) laser beam) of the region of visible ray and emits a light of a region of the predetermined wavelength band therefrom, on the other hand, on the surface, upon which the excitation light is incident (i.e., a lower surface), is provided a reflection coat 146, as the reflection film (or layer) for transmitting only the blue color (B) laser beam as the excitation light. Within the other segment region "B", on an upper surface for emitting the excitation light therefrom, together with the scattering surface 147 for scattering the excitation light, there is further formed the penetration film 145 mentioned above, covering over the surface thereof, as the phase converting means for shifting the phase of the excitation light only by ¼ wavelength (¼λ), and, on the lower surface thereof, upon which the excitation light is incident, there is further formed a penetration film 145' for transmitting a component polarized in one direction included in the excitation light therethrough, while reflecting components polarized in other directions thereupon.

Figure 13B:
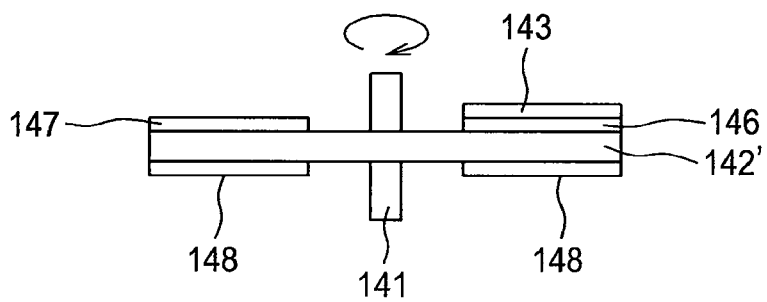

Or, alternatively, in the place of the above-mentioned, as is shown in FIG. 13B attached herewith, within one segment region "Y", on the upper surface for emitting the excitation light therefrom may be formed the reflection coat 146 mentioned above for transmitting only the blue color laser beam therethrough, at first, and on that may be further formed the fluorescence surface 143 mentioned above, while forming an anti-reflection film (i.e., an AR coat) 148 for preventing the excitation light from being reflected on the surface thereof, on the other lower surface, upon which the excitation light is incident. In that instance, within the other segment region "B", on the upper surface for emitting the excitation light therefrom is formed the scattering surface 147 for scattering the excitation light thereon, and on the lower surface, upon which the excitation light is incident, is formed the anti-reflection film (the AR coat) 148 mentioned above. Further, an example of the optical characteristic (i.e., a transmission factor) equipped by the reflection coat 146 mentioned above is shown in FIG. 14 attached herewith.

With such structures of the base member 142' as was mentioned above within the disc (or wheel) member 140', the excitation light (e.g., the B-light) is transmitted onto the incident surface of the excitation light of the segment "Y" (e.g., the lower surface), providing the layer of fluorescent substance thereon, and with provision of the reflection coat 146, i.e., the reflection film (or layer) having a wavelength characteristic of reflecting the light beam or flux (Y-light) emitting from the fluorescent substance, then it is possible to collect the light beam or flux emitting from the fluorescent substance, effectively, on the light emitting surface of the base member; thereby increasing an efficiency of emission of lights. Also, with provision of the anti-reflection film (the AR coat) 148, e.g., the anti-reflection film (or layer) on the incident surface (i.e., the lower surface) of the segment "B", being provided with the scattering surface for scattering the excitation light thereon, it is possible to lighten or reduce reflection loss on the incident surface thereof.

Further, for the purpose of increasing the efficiency of utilizing the lights when scattering the excitation light, on the incident surface of the excitation light (i.e., a lower surface) of the segment "B", being provided with the scattering surface for scattering the excitation light thereon, there is provided the penetration film 145', e.g., the reflection film (or layer) for transmitting a component polarized in one direction included in the excitation light therethrough, while reflecting components polarized in other directions thereupon. The excitation light passing through this film is converted in the phase thereof by the phase converting means for shifting the phase of the excitation light only by ¼ wavelength (¼λ), and thereafter, it is scattered on the scattering surface, which is provided on the surface or in the vicinity of the surface of the base member. Among of those scattered lights, the light turning back onto the incident surface of the excitation light, due to the fact that it passes through the phase converting means mentioned above, again, is shifted in the phase thereof by ½ wavelength (½λ); i.e., being aligned into the polarization direction different from the original excitation light. As a result thereof, it is reflected on the reflection film (or layer) provided on the incident surface of the excitation light, so that it emits from the scattering surface provided on the other surface of the base member. In this instance, since it is possible to turn a half (½) of the return light onto the incident surface back to the emission surface, again, then an improvement can be achieved on the efficiency of utilizing the lights.

In this manner, also in case of using the permeable base member as the base member 142' of the disc (or wheel) member 140', it is possible to rotate this base member at the desired speed, and thereby taking out the excitation light scattering on the scattering surface after passing through that base member, as well as, the flux of lights emitting from the fluorescent substance, in a manner of time-sharing. However, since the fluorescent substance is excited by the excitation light, thereby generating heats therein, it is possible to cool down the fluorescent substance, efficiently, by making that permeable base member 142' with using a material being high in thermal conductivity thereof, such as, glass, crystal, sapphire, etc., for example, and as a result thereof, this results into an increase of the light emission efficacy of the fluorescent substance, and further is advantageous for along lifetime thereof.

Also, in the example mentioned above, for the purpose of capturing both the excitation light scattering on the scattering surface, after passing through the permeable base member, and the flux of lights emitting from the fluorescent substance excited by that excitation light, efficiently, there is adopted a reflecting/capturing means of reflection-type, having the same configuration (i.e., the first and second reflection mirrors (or, reflectors) 130 and 130'). However, for the purpose of capturing both the excitation light scattering on the scattering surface, after passing through the permeable base member, and the flux of lights emitting from the fluorescent substance excited by that excitation light, efficiently, it is preferable to bring the focus points "F" of the first and second reflection mirrors (or reflectors) 130 and 130', i.e., the beam condensing or focusing point and an emission point of the fluorescence light, to be coincident with each other, approximately, and with this, since the flux of lights emitting from the fluorescent substance can be outputted, as the light beams being nearly parallel with, therefore it is preferable to be a light source of the projection-type display apparatus, in particular. However, the reflection surfaces 131 and 131' of those reflection mirrors (or reflectors), as was mentioned above, they may be preferably the reflection mirrors (or surfaces), each having a parabolic surface obtained by rotating the parabola or a curved surface obtainable upon basis on that parabolic surface, or an oval surface obtained by rotating an oval or a curves surface obtainable upon basis of that oval surface, and further, in a front or a rear thereof may be disposed a concave lens and a convex lens, respectively, depending on necessity thereof.

And, in the vicinity of the focus points of the reflection surfaces of the first and the second reflection mirrors (or reflectors) 130 and 130' mentioned above, exchanging the segment regions "B" and "Y" formed on the base member 142, sequentially (i.e., a rotating movement in the present example), the fluorescence light from the one segment "Y" and the scattered excitation light from the other segment "B" are taken out, alternately, and the excitation light of the B-color and the fluorescence light of the Y-color are mixed due to the afterglow or persistence, and thereby obtaining the light flux of white color.

Figure 15:
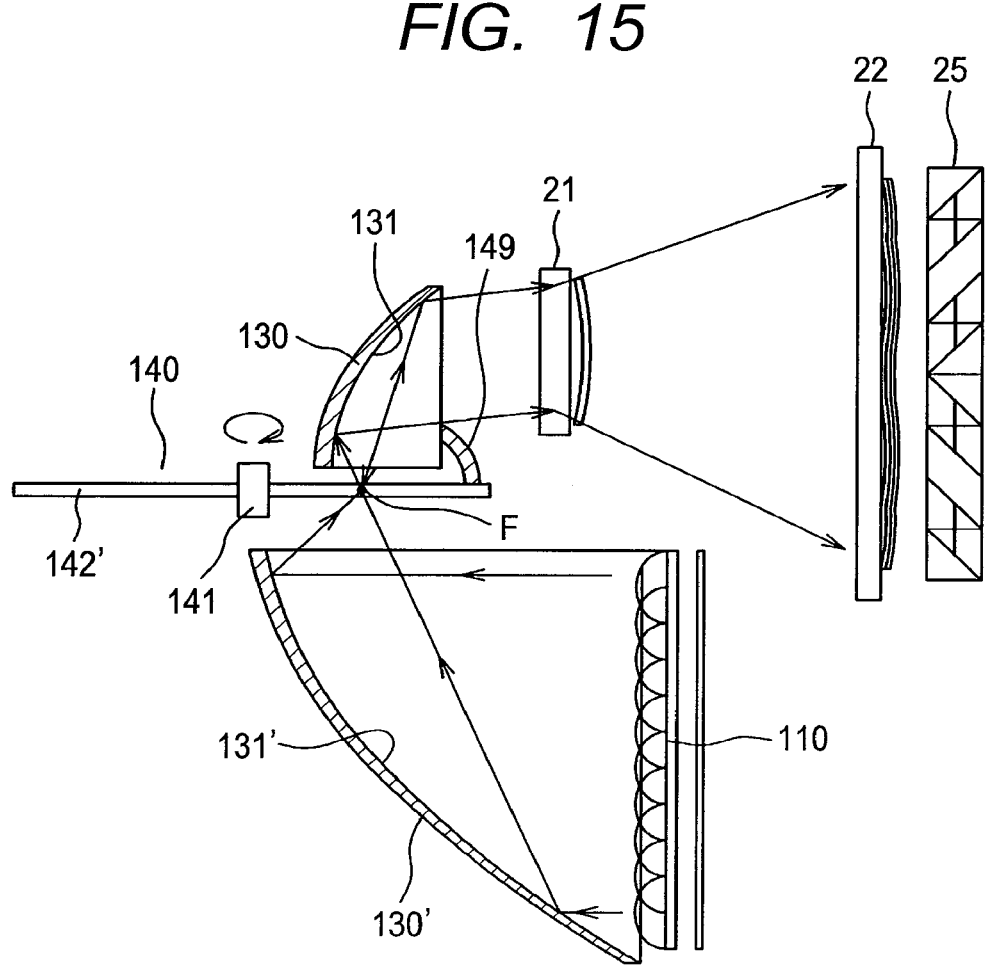
FIG. 15 is a view for showing the structures of a variation of the light source unit according to the embodiment 2.

Further, in FIG. 15 attached herewith is shown a variation of the light source unit (i.e., the solid-state light source device), according to the embodiment 2 mentioned above, and in this variation, as is apparent from the figure, the first reflection mirror (or reflector) 130 is made much smaller than the second reflection mirror (or reflector) 130', in diameter thereof. Thus, with such variation, it is possible to obtain the white color lights from the first reflection mirror (or reflector) 130, in the similar manner to that of the light source unit mentioned above, according to the embodiment 2. However, in this variation, being similar to the variation shown in FIG. 8 mentioned above, on the outer periphery portion of the disc (or wheel) member 140' is provided the reflector of a spherical surface (or spherical surface reflector) 149, for reflecting the fluorescence light thereupon, emitting from the vicinity of the focus point "F", upon which the excitation light is incident, but not reaching onto the reflection surface 131 of the reflection mirror (or reflector) 130. With such spherical surface reflector 149, since almost of all of the fluorescence lights emitting from the vicinity of the focus point "F" can be outputted through the reflection mirror (or reflector) 130, therefore it is advantageous from a viewpoint of an efficiency of utilizing the lights.

In addition thereto, on the surface of the permeable base member 142' of the disc (or wheel) member 140' mentioned above, on the light emission side thereof (i.e., an upper surface), it is also possible to form a large number of miniature cone-shaped dents or pits, as was shown in FIGS. 6A and 6B, and 7A and 7B, and in that instance, as is similar to the above-mentioned, the fluorescence lights emitting from the light emitting surface due to the incidence of the excitation light, or/and, the excitation lights penetrating/scattering upon the penetrating/scattering surface are narrowed of the scattering directions thereof (i.e., giving a direction), then it would be apparent for the person skilled in the art, that it is advantageous from the viewpoint of an efficiency of utilizing the lights.

In the explanation given in the above, although the surface of the disc-like base member is divided into the plural numbers of segments "Y" and "B", for the purpose of exchanging in time-sequence, successively, between the fluorescence surface and the reflecting/scattering surface or the penetrating/scattering surface, which are formed on the base member, with respect to the excitation lights condensed or focused in the vicinity of the focus point "F" from the reflection mirror (or reflector), in the structures thereof; however, the present invention should not be restricted to this, and for example, the fluorescence surface and the reflecting/scattering surface or the penetrating/scattering surface may be formed on the surface of one (1) piece of rectangular base member, and this member may be shifted front and back, with applying vibration, etc., for example; thereby it is possible to obtain the similar effect thereto.

Further, hereinafter will be explained the details of the separation mirror 120 mentioned above, by referring to FIGS. 17 to 20 attached herewith.

Figure 17:
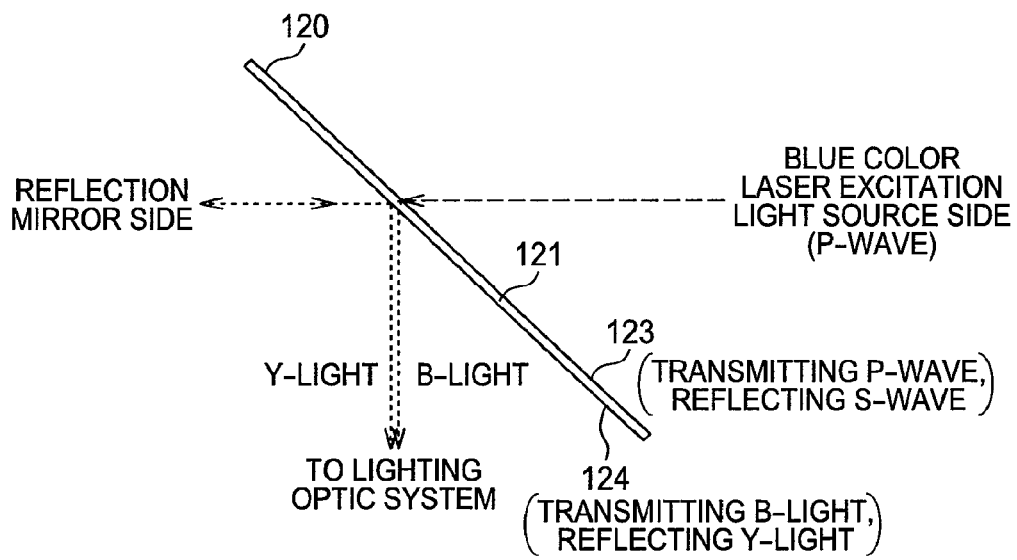
FIG. 17 is a view for showing a general structure of the separation mirror in the light source.

First of all, the structures of a general separation mirror will be shown in FIG. 17. On the side of the blue color laser light source of the base member 121 of the separation mirror 120 is evaporated a polarized wave separation coat 123, for transmitting the P-polarized light while reflecting the S-polarized light thereon, and on the reflection mirror (or reflector) side opposite thereto is evaporated a dichroic coat 124, for transmitting the blue color light while reflecting the yellow light thereon. The blue color laser beams aligned into the P-polarized light are incident upon the separation mirror 120, and after passing through the polarized wave separation coat surface 123 and the dichroic coat surface 124, they are incident upon or enters onto the reflection mirror (or reflector), which is not shown in the figure herein. The blue color laser beams incident upon the reflection mirror (or reflector) are condensed or focused onto a point on the disc (or wheel) member not shown in the figure, wherein a part of the blue color lights excites the fluorescent substance, thereby emitting the yellow color light, and a part of the blue color lights is rotated of the polarization thereof by 90 degree to be the S-polarized light, thereby being scattered. Then, after coming to be parallel lights on the reflection mirror (or reflector), the yellow color lights and the blue color lights aligned to the S-polarized lights are incident upon the separation mirror 120, again. The yellow color lights are reflected on the dichroic coat surface 124, to be incident upon a side of the lighting system. On the other hand, the blue color lights aligned to the S-polarized lights, after passing through the dichroic coat surface 124 and being reflected on the polarized wave separation coat surface 123, are incident upon a side of the lighting optic system. However, in that instance, a shift of optical axis is generated between the yellow color light and the blue color light due to thickness of the base member of the separation mirror. Since distribution of light intensity, which is influenced by the lighting optic system, comes to a Lambert distribution centering round the optical axis, therefore, if the optical axis is shifted depending on the color, unevenness of color is generated, when the lights are projected on a screen. In more details, when applying a common blue plate having thickness of 0.7 mm, as the glass base member 121 of the separation mirror 120, for example, the shift of optical axis of about 0.5 mm is generated. Although, it is a level having no problem, from a practical viewpoint, if such shift of optical axis is about 0.5 mm or the like, as the color unevenness, however, if an output of the light source comes to be large and there occurs a necessity of bringing the thickness the base member 121 to be large from a viewpoint of durability thereof, for example, then distance between the polarized wave separation coat surface 123 and the dichroic coat surface 124 to be formed must be large, and then the color unevenness accompanying the shift of optical axis cannot be neglected.

Figure 18:
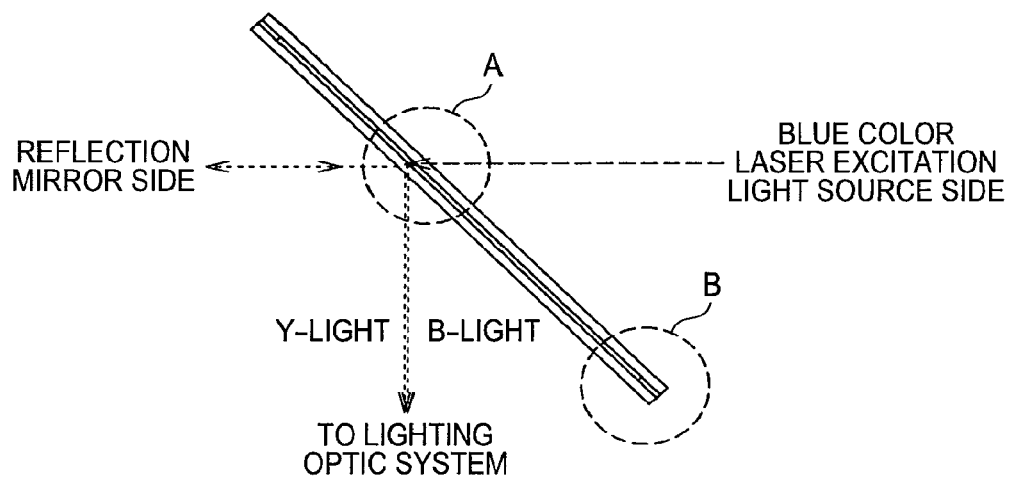
FIG. 18 is a view for showing other structure of the separation mirror.
Figure 19:
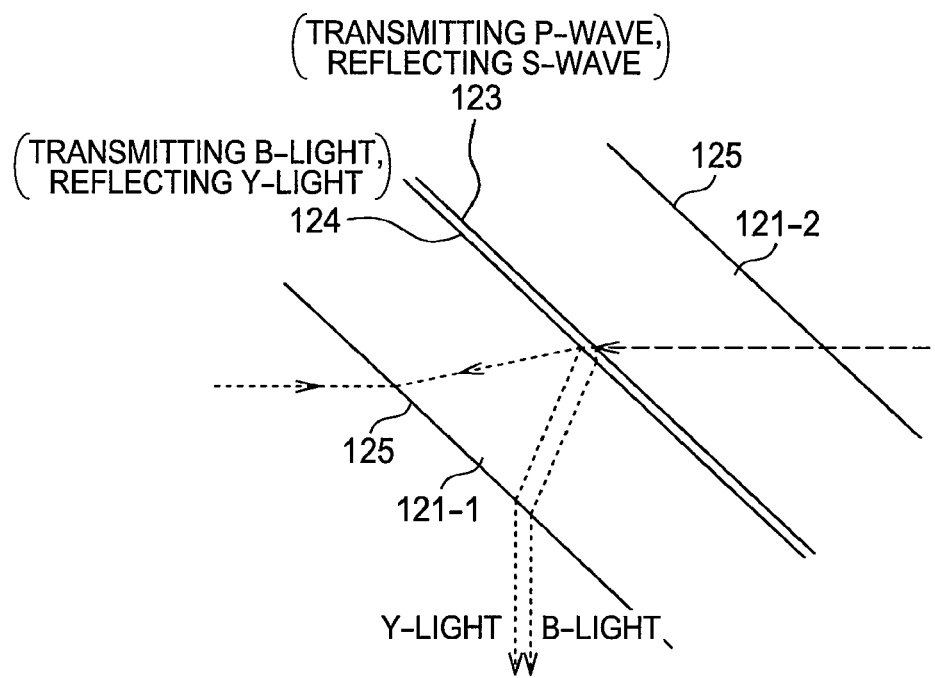
FIG. 19 is an enlarged view of a portion (i.e., "A" portion) of the separation mirror shown in FIG. 18.
Figure 20:
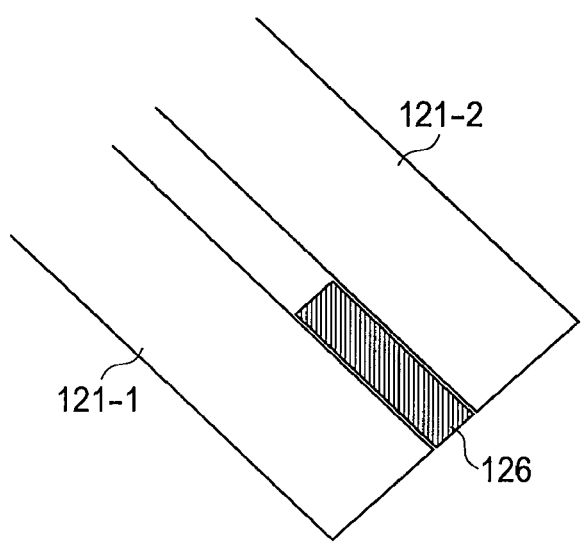
FIG. 20 is an enlarged view of a portion (i.e., "B" portion) of the separation mirror shown in FIG. 18.

Then, hereinafter, the structure of a separation mirror 120', which can reduce the shift of optical axis mentioned above, but not depending on the thickness of the base member 121, by referring to FIGS. 18 to 20. However, with the structure of this separation mirror 120', as is shown in FIG. 19 (i.e., an enlarged view of a part ("A" portion) of FIG. 18 mentioned above), a base member 121-1, on which the polarized wave separation coat 123 is evaporated, and a base member 121-2, on which the dichroic coat 124 is evaporated, are combined with. Thus, on a side of the blue color laser light source is disposed the base member 121-1, on which the polarized wave separation coat 123 is evaporated, while on a side of the reflection mirror (or reflector) is disposed the base member 121-2, on which the dichroic coat 124 is evaporated, and wherein the polarized wave separation coat 123 and the dichroic coat 124 are conditioned to face to each other. Also, on the base members 121-1 and 121-2, on a surface of the side opposite to the surface, on which the polarized wave separation coat 123 is formed, and on a surface of the side opposite to the surface, on which the dichroic coat 124 is formed are evaporated anti-reflection coats 125, respectively.

With the separation mirror 120' mentioned above, although an amount of the shift of optical axis is determined depending on the distance between the polarized wave separation coat surface 123 and the dichroic coat surface 124; however, differing from the structure shown in FIG. 17, it does not depending the thickness of the base elements 121-1 and 121-2, therefore it is possible to reduce the shift of optical axis by shortening the distance between the distance between the polarized wave separation coat surface 123 and the dichroic coat surface 124 to be small. For example, if determining the distance between the distance between the polarized wave separation coat surface 123 and the dichroic coat surface 124 to be equal 0.35 mm or less than that, then the amount of the shift of optical axis can be reduced to be equal 0.5 mm or lower than that. Also, for the purpose of deleting the shift of optical axis, completely, it is preferable to bring the polarized wave separation coat surface and the dichroic coat surface to contact with each other; however, as the polarized wave separation coat, in particular, when applying an aluminum wire grid therein, for example, there is a possibility that the aluminum wire grid can be broken by contacting on the base member opposite thereto.

Then, according to the present example, as a means for maintaining the distance between the polarized wave separation coat surface 123 and the dichroic coat surface 124, it can be considered to fill up a transparent UV hardening adhesive between the two (2) base members 121-1 and 121-2, and thereafter, irradiating UV on that adhesive to connect them. However, since such members are disposed at the positions near to the light source, then there can be generated a problem of deterioration by the lights and/or the temperatures thereof, if applying an organic UV adhesive there in. Then, as is shown in FIG. 20 (i.e., an enlarged view of a portion ("B" portion) of FIG. 18 mentioned above), it is desirable to insert a spacer 126 having desired thickness between them, outside the light effective region thereof, thereby maintaining a constant distance therebetween. Further, as a material of this spacer, preferably, may be a metal having heat-resisting characteristic, such as, aluminum of cheap price, for example. Herein, although is shown an example for maintaining the distance between the polarized wave separation coat surface 123 and the dichroic coat surface 124 to be constant; however, in future, there may be a possibility of applying a method of, so-called, nano-bonding, etc., for connecting glasses themselves, without applying an organic member therein, and it will be apparent that for the skilled in the art, it will fall within a region of the present invention in such case.

The present invention may be embodied in other specific forms without departing from the spirit or essential feature or characteristics thereof. The present embodiment(s) is/are therefore to be considered in all respects as illustrative and not restrictive, the scope of the invention being indicated by the appended claims rather than by the forgoing description and range of equivalency of the claims are therefore to be embraces therein.

What is claimed is:

1. A projection-type display apparatus, comprising:
   a solid-state light source device, which is configured to irradiate a white color light therefrom;
   a light modulating portion, which is configured to modulate the white color light from said solid-state light source device, thereby forming an optical image, depending on a video signal inputted; and
   a light projection portion, which is configured to project said optical image composed, enlargedly, wherein
   said solid-state light source device comprises:
   a solid-state light emitting portion, which is configured to emit excitation light therefrom;
   a beam condensing portion, which is configured to condense the excitation light from said solid-state light emitting portion to be point-like;
   a base member, including fluorescence regions, including a fluorescent substance, and reflection/scattering regions, configured to receive the condensed excitation light alternately at the fluorescence regions, and emit converted light having a different wavelength than that of the received excitation light, and at the reflection/scattering regions, and reflect as reflected/scattered light; and
   a separation mirror, configured to allow excitation light from the solid-state light emitting portion to pass through toward the beam condensing portion, and configured to receive the reflected/scattered light and the converted light and transmit them on a same optical path, thereby outputting light with an approximately white color.

2. The projection-type display apparatus, as described in the claim 1, wherein, and
   respective portions of said reflection/scattering regions and said fluorescence regions, on the surface of said base member and also in vicinity of the focus point of said condensed excitation light, include a plural number of miniature pits for giving a direction to the scattered light from said reflecting/scattering regions or said fluorescent substance in vicinity of said focus point.

3. The projection-type display apparatus, as described in the claim 2, wherein said solid-state light emitting portion is constructed with plural numbers of light emitting diodes or semiconductor laser elements, which are disposed on a plane.

4. The projection-type display apparatus, as described in the claim 3, wherein said fluorescent substance emits light flux of a region of wavelength having a relation of being complementary color to said excitation light for a white color.

5. The projection-type display apparatus, as described in the claim 4, wherein
said light emitting diodes or said semiconductor laser elements emit a blue color light.

6. The projection-type display apparatus, as described in the claim 4, wherein
the excitation light from said solid-state light emitting portion is a blue color light, being aligned a plane of polarization thereof into one direction.

7. The projection-type display apparatus, as described in the claim 2, wherein
said beam condensing portion comprises a mirror surface made of a parabolic surface or an oval surface, where the separation mirror is arranged to face said mirror surface inclining to a direction of rotation axis thereof, and thereby reflecting the excitation light aligned in a plane of polarization thereof into one direction towards said mirror surface, while transmitting the excitation light of other directions therethrough, in common with.

8. The projection-type display apparatus, as described in the claim 2, wherein
the base member has a disc-like shape and alternately receive the condensed excitation light at the fluorescence regions and the reflection/scattering regions through rotating movement of said base member with a disc-like shape.

9. The projection-type display apparatus, as described in the claim 2, wherein
said base member is made of a material having thermal conductivity, being equal to or higher than $5/W \cdot m^{-1} \cdot K^{-1}$.

10. The projection-type display apparatus, as described in the claim 2, wherein said reflecting/scattering regions of said base member include a penetrating film configured to change a polarization direction of the received excitation light.

11. The projection-type display apparatus, as described in the claim 2, wherein
said fluorescent substance is $Y_3Al_5O_{12}$:Ce.

12. The projection-type display apparatus, as described in the claim 2, wherein
said fluorescent substance is $(Si,Ba)_2SiO_2$ of a silicon group.

13. The projection-type display apparatus, as described in the claim 2, further comprising:
a fluorescent substance, within said reflecting/scattering regions provided for scattering/transmitting a part of blue color excitation light so as to excite a part thereof, thereby emitting a light of a blue-green color band therefrom.

14. The projection-type display apparatus, as described in the claim 1, further comprising:
a light separation optical system, which is configured to separate the white color light from said solid-state light source device into three (3) primary colors, including R (red color), G (green color) and B (blue color), wherein said light modulating portion modulates the polarized lights separated into R, G and B, respectively, thereby forming optical images depending on the video signal inputted; and
a light composing portion, which is configured to compose the optical images, each being formed by said light modulating portion.

\* \* \* \* \*